United States Patent
Seo

(10) Patent No.: US 10,257,817 B2
(45) Date of Patent: Apr. 9, 2019

(54) METHOD AND APPARATUS FOR TRANSMITTING AND RECEIVING SIGNAL BY DEVICE-TO-DEVICE TERMINAL IN WIRELESS COMMUNICATION SYSTEM

(71) Applicant: LG ELECTRONICS INC., Seoul (KR)

(72) Inventor: Inkwon Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 75 days.

(21) Appl. No.: 15/311,380

(22) PCT Filed: May 18, 2015

(86) PCT No.: PCT/KR2015/004970
§ 371 (c)(1),
(2) Date: Nov. 15, 2016

(87) PCT Pub. No.: WO2015/174805
PCT Pub. Date: Nov. 19, 2015

(65) Prior Publication Data
US 2017/0086176 A1    Mar. 23, 2017

Related U.S. Application Data

(60) Provisional application No. 61/994,126, filed on May 16, 2014.

(51) Int. Cl.
*H04L 1/00* (2006.01)
*H04W 56/00* (2009.01)
(Continued)

(52) U.S. Cl.
CPC ............ *H04W 72/042* (2013.01); *H04L 1/00* (2013.01); *H04L 1/0061* (2013.01);
(Continued)

(58) Field of Classification Search
None
See application file for complete search history.

(56) References Cited

U.S. PATENT DOCUMENTS

2013/0324182 A1* 12/2013 Deng .................. H04W 52/281
                                                 455/522
2014/0023008 A1    1/2014 Ahn et al.
(Continued)

FOREIGN PATENT DOCUMENTS

| KR | 10-2012-0074254 A | 7/2012 |
| WO | WO 2013/191360 A1 | 12/2013 |
| WO | WO 2014/003430 A1 | 1/2014 |

OTHER PUBLICATIONS

Asadi et al., "A Survey on Device-to-Device Communication in Cellular Networks," IEEE Communications Surveys & Tutorials, Apr. 24, 2014, pp. 1-18.
(Continued)

*Primary Examiner* — Chirag G Shah
*Assistant Examiner* — Srinivasa R Reddivalam
(74) *Attorney, Agent, or Firm* — Birch, Stewart, Kolasch & Birch, LLP

(57) ABSTRACT

One embodiment of the present invention is a method for a device-to-device (D2D) terminal to transmit and receive a signal in a wireless communication system, the method comprising: receiving downlink control information (DCI) comprising resource allocation information; checking the cyclic redundancy check (CRC) of the DCI by using a D2D radio network temporary identifier (RNTI); and, if there is no error in the result of the CRC check, performing D2D communication on resources denoted in the resource allocation information, wherein if the TPC field of the DCI is a pre-set value, a downlink signal is received from a base station on resources denoted in the resource allocation information.

14 Claims, 7 Drawing Sheets

(51) Int. Cl.
  *H04W 72/04* (2009.01)
  *H04W 76/11* (2018.01)
(52) U.S. Cl.
  CPC .......... *H04W 56/002* (2013.01); *H04W 76/11* (2018.02); *H04Q 2213/13215* (2013.01)

(56) References Cited

U.S. PATENT DOCUMENTS

| | | | |
|---|---|---|---|
| 2014/0328329 A1* | 11/2014 | Novlan | H04W 72/042 370/336 |
| 2015/0173048 A1 | 6/2015 | Seo et al. | |
| 2015/0181366 A1 | 6/2015 | Chae et al. | |
| 2015/0327180 A1* | 11/2015 | Ryu | H04L 1/00 370/329 |
| 2015/0327188 A1* | 11/2015 | Bagheri | H04W 52/383 455/426.1 |

OTHER PUBLICATIONS

Qualcomm Incorporated, "Remaining Aspects of DCH Enhancements," 3GPP TSG RAN WG1 Meeting #76bis, R1-141705, Shenzhen, China, Mar. 31-Apr. 4, 2014 (Mar. 22, 2014), 6 pages.

* cited by examiner

METHOD AND APPARATUS FOR TRANSMITTING AND RECEIVING SIGNAL BY DEVICE-TO-DEVICE TERMINAL IN WIRELESS COMMUNICATION SYSTEM

CROSS REFERENCE TO RELATED APPLICATIONS

This application is the National Phase of PCT International Application No. PCT/KR2015/004970, filed on May 18, 2015, which claims priority under 35 U.S.C. 119(e) to U.S. Provisional Application No. 61/994,126, filed on May 16, 2014, all of which are hereby expressly incorporated by reference into the present application.

TECHNICAL FIELD

The following description relates to a wireless communication system, and more particularly, to a method for transceiving a signal in a device-to-device communication and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

The present invention relates to a D2D communication method for using a limited resource effectively in D2D communication.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one embodiment of the present invention, provided herein is a method for a D2D (Device to Device) user equipment to transceive a signal in a wireless communication system, the method including receiving DCI (Downlink control information) including resource allocation information; making a CRC (Cyclic redundancy check) on the DCI using a D2D RNTI (Radio Network Temporary Identifier); performing D2D communication on a resource indicated in the resource allocation information if a result of the CRC is errorless, wherein a downlink signal is received from a base station on the resource indicated in the resource allocation information if a TPC field value of the DCI is a preset value.

The CRC using the D2D RNTI may be performed only if a subframe having the DCI received therein is included in a subframe set.

If the CRC result is errorless and the TPC field value is the preset value, a D2D synchronization signal may be regarded as not transmitted.

If the CRC result is errorless and the TPC field value is the preset value, the resource indicated in the resource allocation information may not overlap with a resource indicated if the CRC result is errorless but the TPC field value is not the preset value.

If the CRC result is errorless and the TPC field value is the preset value, the user equipment may assume that D2DSS (D2D synchronization signal), SA (scheduling assignment) and PD2DSCH (Physical D2D synchronization channel) are not transmitted.

If the CRC result is errorless and the TPC field value is the preset value, the user equipment may regard a large-scale feature as the same as a synchronization signal transmitted from the base station when receiving the downlink signal from the base station on the resource indicated in the resource allocation information.

The resource indicated in the resource allocation information may exist on an uplink frequency band.

In another embodiment of the present invention, provided herein is a D2D (Device to Device) user equipment device in a wireless communication system, a user equipment device including a receiver module; and a processor, wherein the processor is configured to receives DCI (Downlink control information) including resource allocation information, make a CRC (Cyclic redundancy check) on the DCI using a D2D RNTI (Radio Network Temporary Identifier), and if a result of the CRC is errorless, perform D2D communication on a resource indicated in the resource allocation information, wherein if a TPC field value of the DCI is a preset value, a downlink signal is received from a base station on the resource indicated in the resource allocation information.

The CRC using the D2D RNTI may be performed only if a subframe having the DCI received therein is included in a subframe set.

If the CRC result is errorless and the TPC field value is the preset value, a D2D synchronization signal may be regarded as not transmitted.

If the CRC result is errorless and the TPC field value is the preset value, the resource indicated in the resource allocation information may not overlap with a resource indicated if the CRC result is errorless but the TPC field value is not the preset value.

If the CRC result is errorless and the TPC field value is the preset value, the user equipment may assume that D2DSS (D2D synchronization signal), SA (scheduling assignment) and PD2DSCH (Physical D2D synchronization channel) are not transmitted.

If the CRC result is errorless and the TPC field value is the preset value, when receiving the downlink signal from the base station on the resource indicated in the resource allocation information, the user equipment may regard a large-scale feature as the same as a synchronization signal transmitted from the base station.

The resource indicated in the resource allocation information may exist on an uplink frequency band.

Advantageous Effects

According to an embodiment of the present invention, a resource overhead due to D2D communication can be reduced by an effective resource distribution if the D2D communication is performed.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
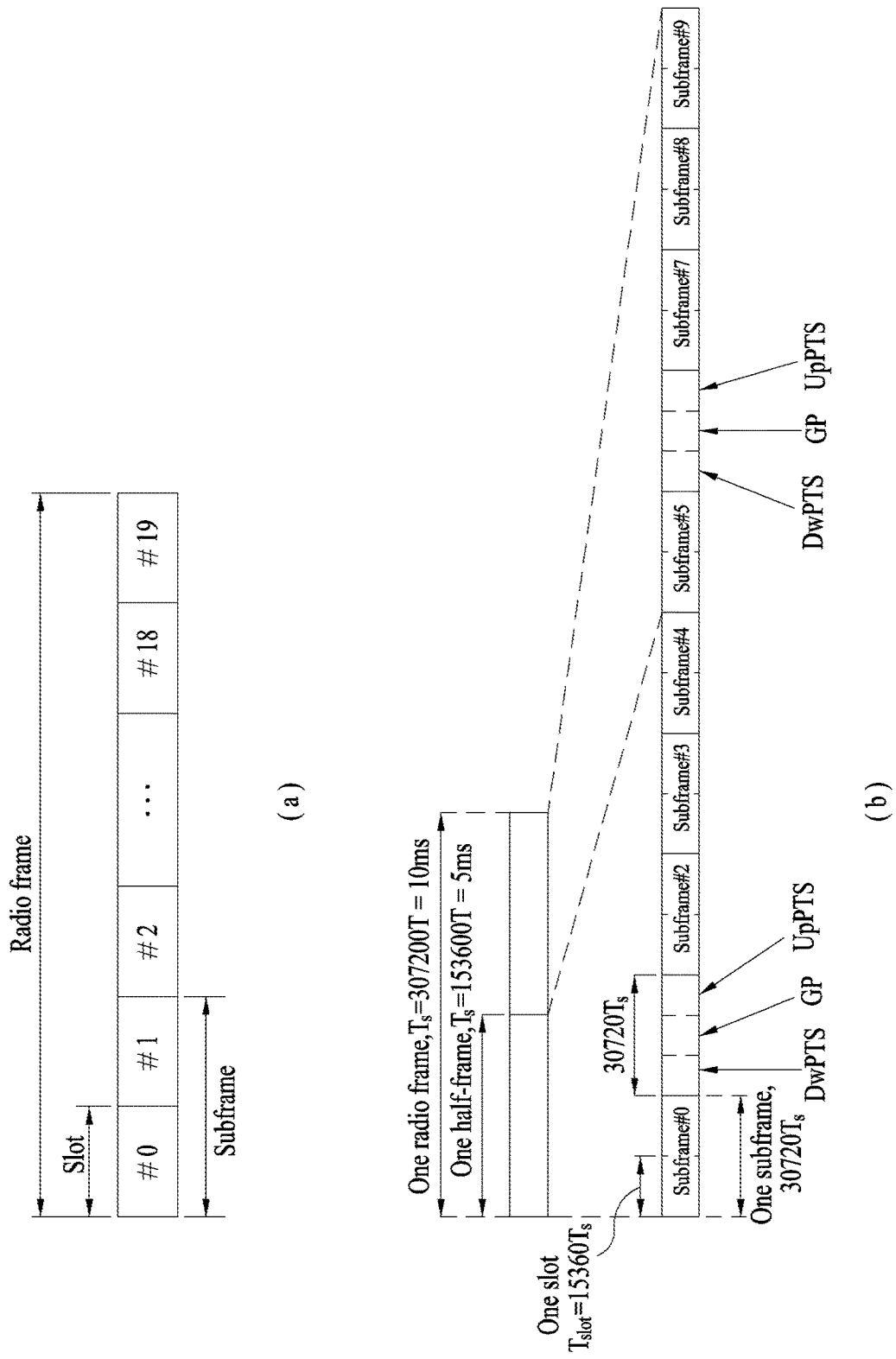
FIG. 1 is a diagram to illustrate a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS, Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN- OFDMA Advanced System). For clarity, this application focuses on the 3GPF LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPF LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPF LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
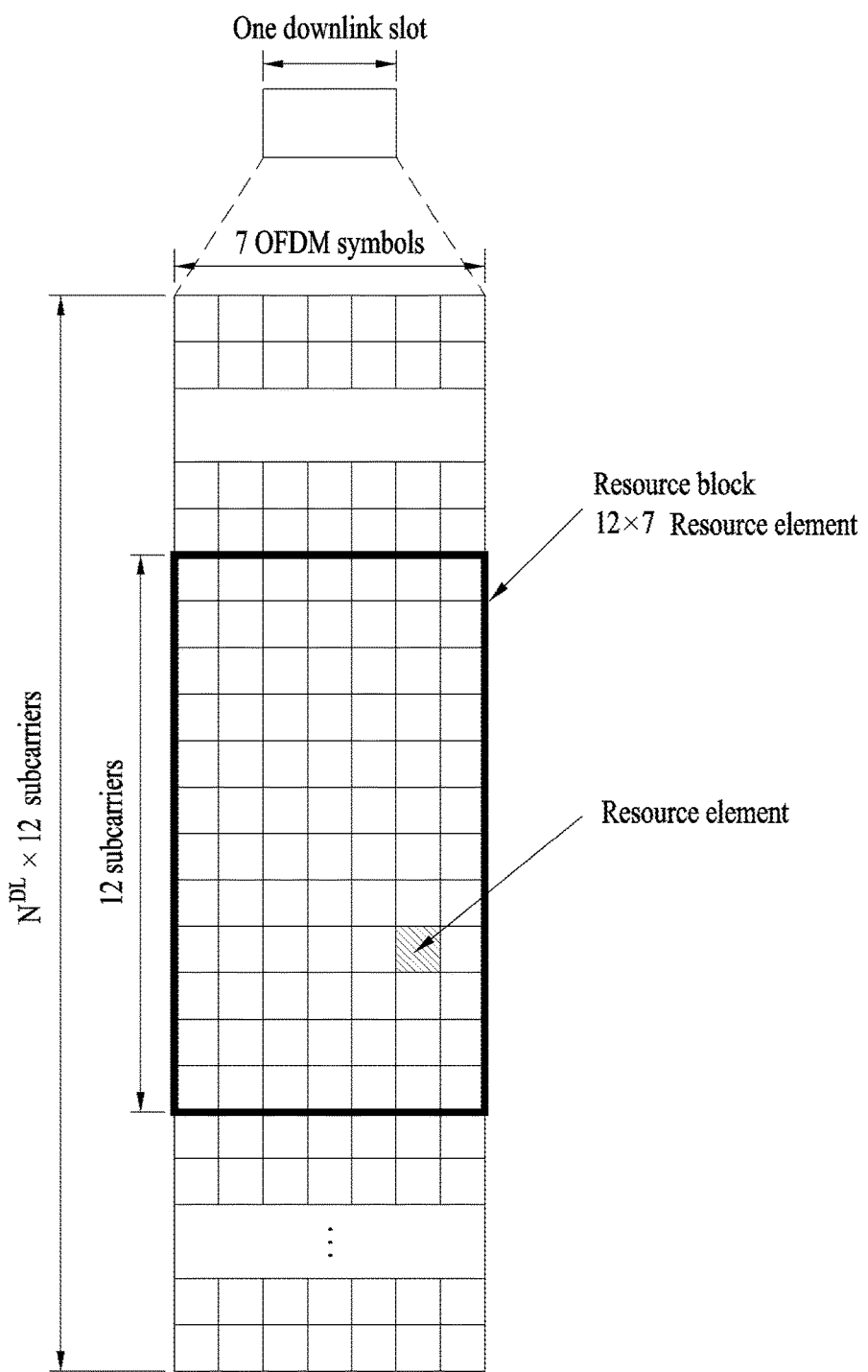
FIG. 2 is a diagram to illustrate a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
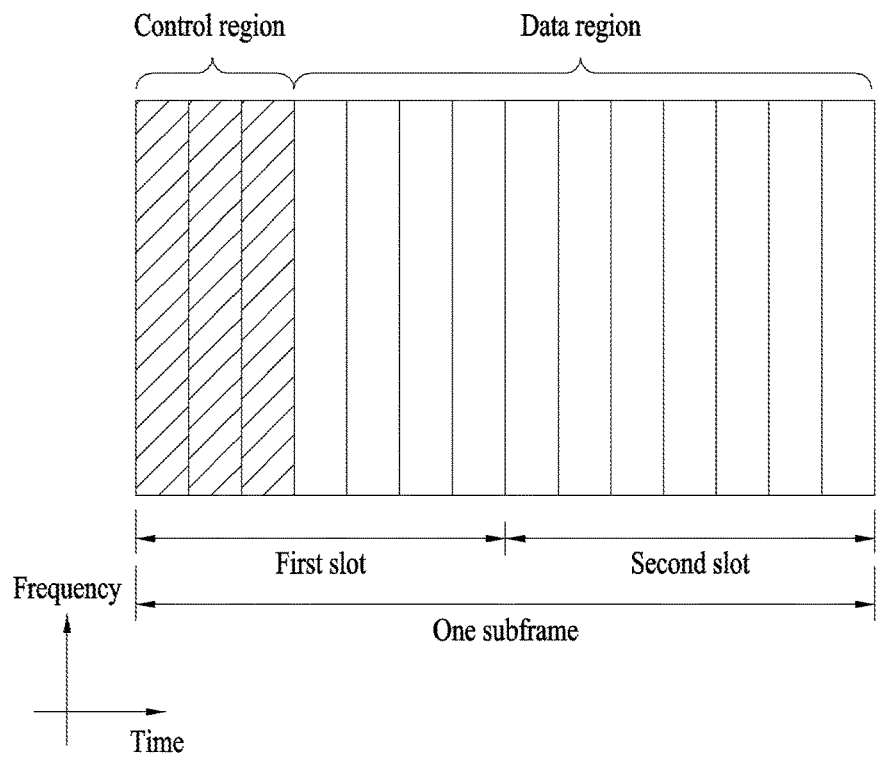
FIG. 3 is a diagram to illustrate a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
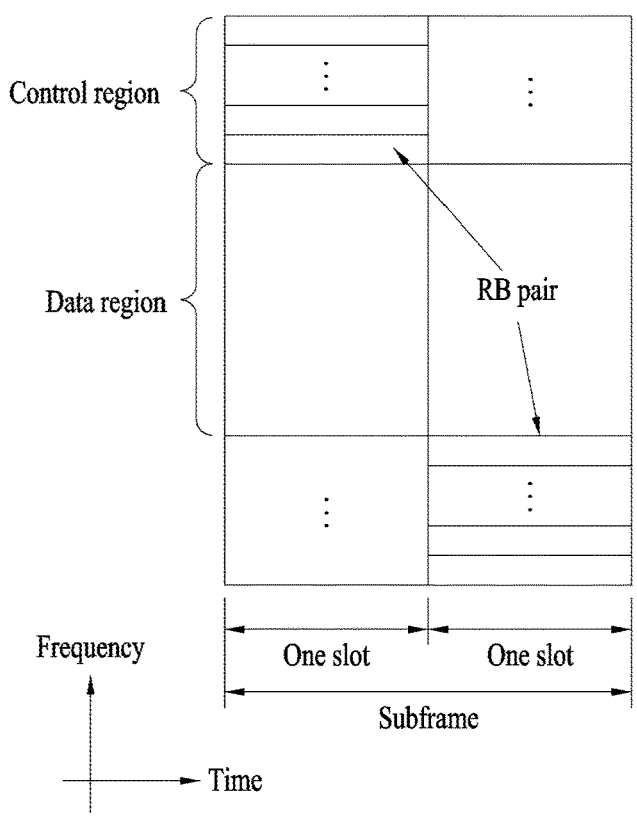
FIG. 4 is a diagram to illustrate a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Measurement/Measurement Report

Measurement report is performed for one or more methods (handover, random access, cell search, etc.) for securing mobility of a UE. Since the measurement report requires coherent demodulation in some degree, the measurement report can be performed after a synchronization parameter and a physical layer parameter are obtained by a UE except reception signal strength measurement. The measurement report can include RRM measurement including RSRP (reference signal receive power), RSSI (received signal strength indicator), RSRQ (reference signal received quality), etc. for measuring signal strength of a serving cell and a neighboring cell or signal strength compared to total reception power and RLM measurement capable of evaluating whether or not a radio link is failed by measuring link quality with a serving cell.

In relation to the RRM, the RSRP is a liner average of power distribution of an RE in which a CRS is transmitted in downlink. The RSSI is a linear average of total reception power received by a UE and the RSSI is measured for an OFDM symbol including an RS for an antenna port 0. The RSSI corresponds to a measurement value including interference, noise power, and the like. If higher layer signaling indicates a specific subframe to measure the RSRQ, the RSSI is measured for all OFDM symbols included in the indicated specific subframe. The RSRQ is a value measured in a form of N*RSRP/RSSI. In this case, the N corresponds to the number of RBs of a corresponding bandwidth at the time of measuring the RSSI.

The RLM is performed to determine whether a UE is 'in-synch' or 'out-of-synch' for a corresponding cell by making the UE monitor downlink quality of a serving cell of the UE. In this case, the RLM is performed based on a CRS. The downlink quality estimated by the UE is compared with 'in-synch threshold (Qin)' and 'out-of-synch threshold (Qout)'. The thresholds can be represented by a PDCCH BLER (block error rate) of a serving cell. In particular, the Qout and the Qin correspond to 10% BLER and 2% BLER, respectively. Practically, the Qin and the Qout are values corresponding to SINR of a received CRS. If reception SINR of the CRS is equal to or greater than a predetermined level (Qin), a UE determines to attach to a corresponding cell. If the reception SINR is equal to or less than the predetermined level (Qout), the UE declares RLF (radio link failure.

Synchronization Acguisition of D2D UE

In the following, synchronization acquisition between UEs in D2D communication is explained based on the aforementioned description and a legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

A transmission period of a D2DSS is not less than 40 ms and one or more symbols can be used for transmitting a D2DSS in a subframe.

D2DSSs may include a primary D2DSS (PD2DSS) or a primary sidelink synchronization signal (PSSS) and a secondary D2DSS (SD2DSS) or a secondary sidelink synchronization Signal (SSSS). The PD2DSS may be configured to have a similar/modified/repeated structure of a Zadoff-chu sequence of a predetermined length or a primary synchronization signal (PSS), and the SD2DSS may be configured to have a similar/modified/repeated structure of an M-sequence or a secondary synchronization signal (SSS).

When a D2D UE selects a D2D synchronization source, it is necessary to apply an identical priority reference. In out-coverage situation, if signal strength of all received D2DSSs is equal to or less than a predetermined value, a UE may become a synchronization source. And, in in-coverage situation, an eNB can configure a UE as a synchronization source. If UEs match synchronization with each other from an eNB, a synchronization source may correspond to the eNB and a D2DSS may correspond to a PSS/SSS. A D2DSS of a synchronization source induced from an eNB may be different from a D2DSS of a synchronization source not induced from the eNB.

A PD2DSCH (physical D2D synchronization channel) may correspond to a (broadcast) channel on which (system) information (e.g., D2DSS-related information, duplex mode (DM), TDD UL/DL configuration, resource pool-related information, a type of application related to a D2DSS, etc.), which is basic information to be firstly known to a UE before a D2D signal is transmitted and received, is transmitted. The PD2DSCH can be transmitted in a subframe in which a D2DSS is transmitted or a following subframe.

The D2DSS may correspond to a specific sequence and the PD2DSCH may correspond to a sequence representing specific information or a codeword produced by predetermined channel coding. In this case, the SRN may be an eNB or a specific D2D UE. In the case of partial network coverage or out of network coverage, a UE may become a synchronization source.

Figure 5:
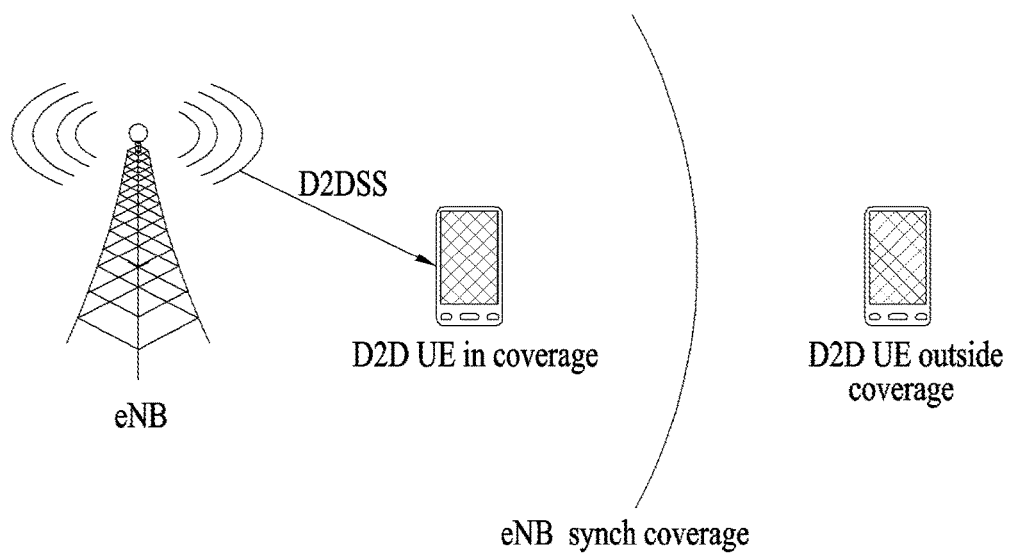
FIG. 5 is a diagram to describe a relay of a synchronization signal.
Figure 6:
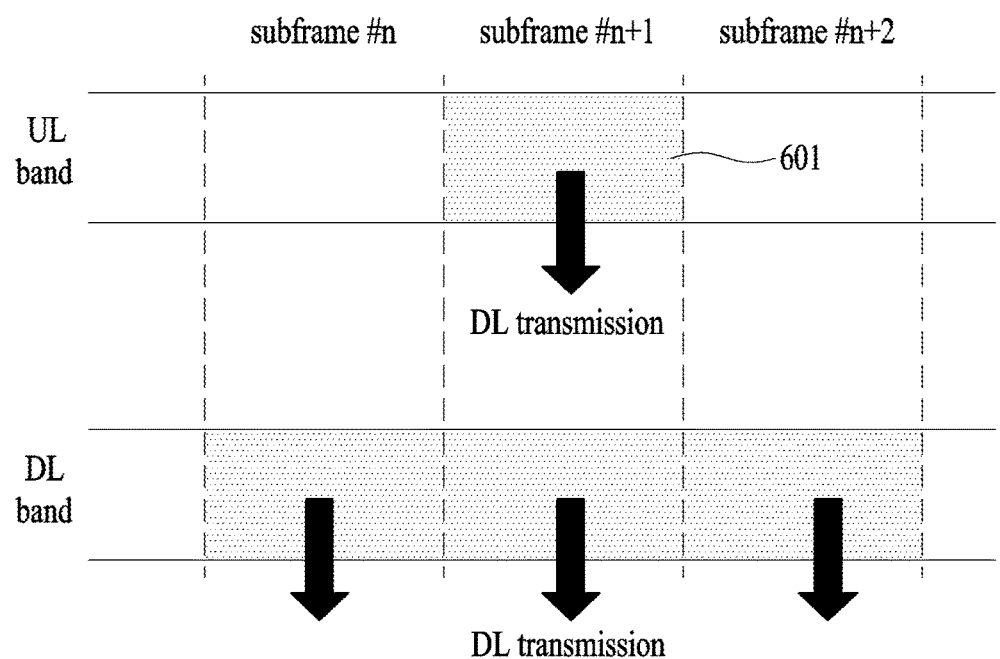
FIGS. 6 to 8 are diagrams to describe a D2D communication method according to an embodiment of the present invention.

In a situation like FIG. 5, a D2DSS may be relayed for a D2D communication with an out-of-coverage user equipment. And, the D2DSS may be relayed through a multi-hop. In the following description, a relay of a synchronization signal is a concept including not only a direct AF relay of a synchronization signal of a base station but also a D2D synchronization signal transmission in a separate format in accordance with a synchronization signal reception timing. As the above, an in-coverage user equipment and an out-of-coverage user equipment can directly perform communication by relaying the D2D synchronization signal. FIG. 6 shows an example of the above relay of the D2D synchronization signal and a situation of communication between D2D user equipments based thereon.

In addition, there may be a case of an edge-coverage D2D, and according to an in-coverage D2D, an out-of-coverage D2D and the edge-coverage D2D, a base station or a network may directly perform a scheduling, or D2D may be performed on a preset resource. For example, the base station may configure a D2D synchronization pool, a D2D scheduling assignment (SA) pool, a D2D discovery pool, a D2D communication pool and the like (or some of them) for user equipments in its coverage, and each of the D2D user equipments may transceive a corresponding signal in a corresponding region. A specific resource for transceiving the corresponding signal may be allocated by the base station directly, or determined in a manner of being selected by the user equipment from a resource pool designated by the base station. And, in order for the D2D user equipment to perform the D2D communication while maintaining cellular communication (WAN), it is necessary to guarantee a gap period for a Tx/Rx switching time, a TA, and so on. And, if D2D and WAN are multiplexed in a single time resource (e.g., a subframe), it is preferable to allocate a D2D resource and a cellular resource independently in a time domain since an ISI (Inter symbol interference) and the like may be generated due to each timing and the like. The following description relates both to a case where the D2D resource and the cellular resource are classified in a time domain and a case where the D2D resource and the cellular resource are multiplexed in a same time resource.

Meanwhile, among time domain resources allocated for a D2D usage, a non-used frequency domain resource may be generated due to a channel condition, an interference coordination, a low D2D traffic, and the like. And, if resources are allocated for D2D in a situation of a large amount of a cellular traffic, a resource for a cellular uplink/downlink traffic may be insufficient. To resolve these problems, the present invention proposes to perform cellular communication between an eNB and a UE using a D20 communication format. According to the present invention, a corresponding resource can be used for another usage other than a pre-configured usage, without influencing an intercell interference and the like. For example, a downlink transmission may be performed on an uplink band or in an uplink subframe, or a cellular data transmission may be performed in a resource designated for a D2D usage. Hereinafter, an embodiment of the present invention will be described in detail.

A D2D user equipment according to an embodiment of the present invention may perform D2D communication or communication with a base station on a resource allocated for the D2D communication. Namely, the user equipment receives DCI (e.g., a D2D grant) including resource allocation information, and makes a CRC (Cyclic redundancy check) of the DCI using a D2D RNTI (Radio Network Temporary Identifier). If an error is not found in a result of the CRC check, the DCI is a DCI for the D2D user equipment, and thus the D2D communication is performed on a resource indicated by the resource allocation information. In this case, if a specific signaling is received from the base station, a downlink signal may be received from the base station on the resource indicated by the resource allocation information. In particular, if a value of TPC (Transmit Power Control) field of the DCI is a preset value, the downlink signal but not a D2D signal from another user equipment may be received from the base station on the resource indicated by the resource allocation information. Since the resource indicated by the resource allocation information exists on an uplink frequency band, (where a D2D resource uses an uplink resource), the uplink resource can be used for a downlink resource usage if the TPC field value is predetermined specific value.

FIG. 6 illustrates the aforementioned example in case of FDD. Referring to FIG. 6, if an error is not found in a result of a CRC check of DCI including resource allocation information (i.e., a D2D resource) and a TPC field value of the DCI is a preset value, not only an existing DL band but also a UL resource 601 indicated by the resource allocation information can be used for a downlink signal transmission. Through such an operation, an overhead due to D2D can be reduced despite that the D2D communication is allowed. (For convenience, hereinafter, a communication using a resource, which is used to receive a downlink signal from a base station, as a UL resource indicated in a D2D grant is referred to as "eNB-to-UE D2D".) In the aforementioned description, herein, as a specific field of a D2D grant indicating the eNB-to-UE D2D, another field (e.g., a new field or a reserved field) but not the mentioned TPC field may be used as well. The CRC check using the D2D RNTI may be performed only if a subframe having the DCI received therein is included in a subframe set.

As another eNB-to-UE D2D indication scheme, it may be able to newly define a D2D grant masked with an RNTI that means eNB-to-UE D2D. In this case, to reduce a blind detection overhead, a subframe set capable of transmitting eNB-to-UE D2D grant may be indicated in advance using an upper layer signaling or the like.

As further scheme, it may be indicated that D2D in a resource designated by a corresponding SA (Scheduling Assignment) is performed by targeting an eNB, based on a DMRS sequence, a cyclic shift (CS) value of the DMRS sequence of an SA allocating a resource for the D2D communication. For example, a user equipment having received a DMRS initialized by a specific DMRS sequence initialization parameter or a user equipment having received a DMRS cyclic-shifted by a specific CS value may recognize that a corresponding D2D communication is performed by targeting an eNB. For another example, the same operation may be performed using an initialization parameter of a scrambling sequence of SA data.

If the error is not found in the result of the CRC check and the TPC field value of the DCI is the preset value, the user equipment may regard a D2D synchronization signal as not transmitted. Namely, since eNB-to-UE D2D communication is performed, the user equipment may adjust an inter-eNB-to-UE D2D timing by an existing PSS/SSS without performing a separate D2D synchronization. This may mean to assume that a user equipment (e.g., a user equipment having received a signaling of eNB-to-UE D2D transmission) performing D2D communication with a base station does not have a separate D2D synchronization signal. This can be also interpreted that a cellular downlink or uplink timing is regarded as a D2D synchronization in eNB-to-UE D2D.

A time-frequency resource indicated by the aforementioned resource allocation information may be a resource other than a time-frequency resource used in a general D2D communication failing to use eNB-to-UE D2D. Namely, if the error is not found in the result of the CRC check and the TPC field value is the preset value, a resource indicated in the resource allocation information may not overlap with a resource indicated in case that the error is not found in the result of the CRC check and the TPC field value is not the preset value. Namely, D2D may be performed even on a resource not designated as a D2D resource pool (for discovery, SA, communication). For example, in the eNB-to-UE D2D, a resource unusable for a UE-to-UE D2D communication usage in a D2D synchronization resource pool may be usable.

Figure 7:
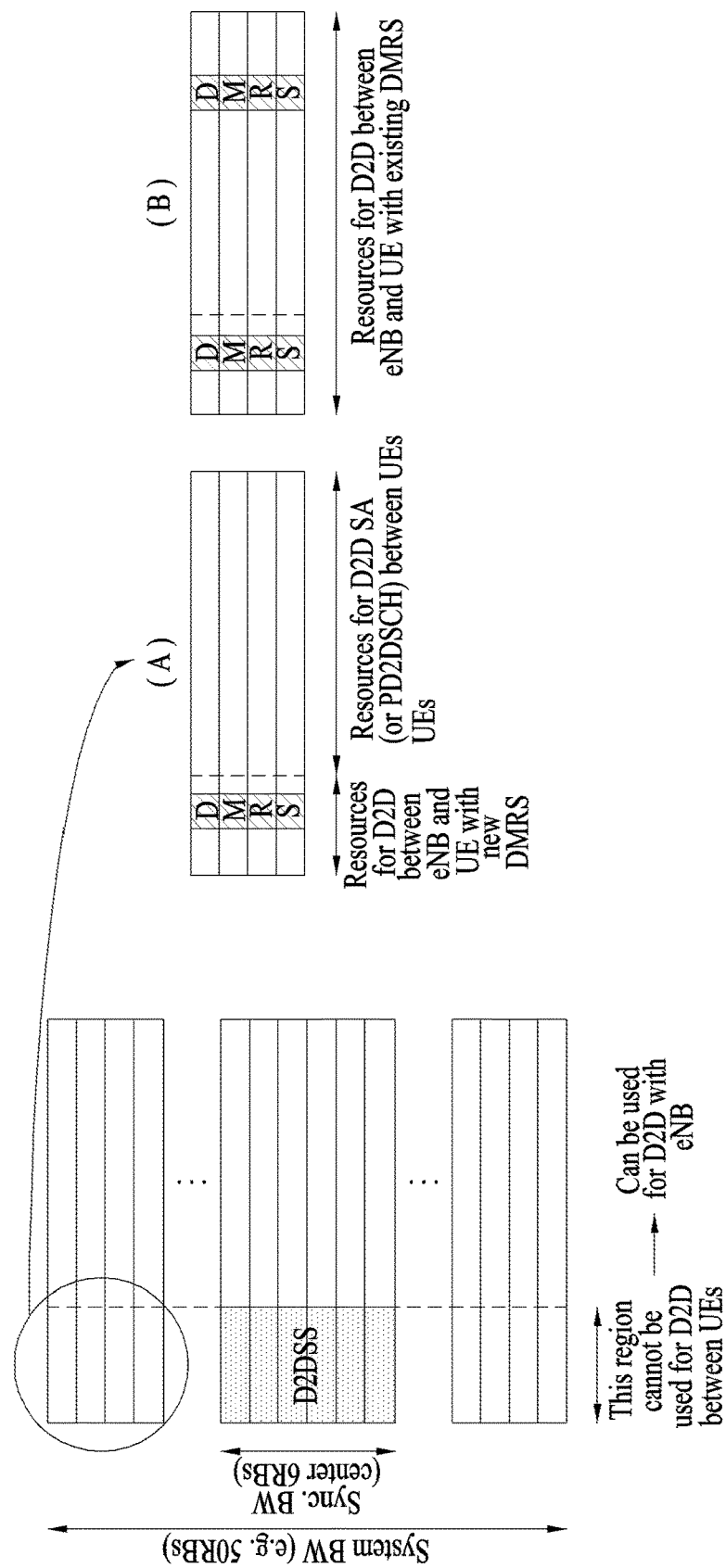

This is described with reference to FIG. 7. FIG. 7 shows an example of a case that eNB-to-UE D2D communication uses only a region that cannot be used for UE-to-UE D2D. In FIG. 7(A), a DMRS transmission symbol may be separately defined, or may use an existing DMRS partially. (For example, if a D2DSS uses first 4 symbols of a subframe, an existing PUSCH DMRS located in the 4th symbol may be reused.) D2D resource corresponds to a case that eNB-to-UE D2D is performed only in a symbol where a synchronization signal is transmitted, and in this case, since UE-to-UE D2D may be performed in the rest of symbols, a DMRS of an eNB-to-UE D2D region may be usable for demodulation. FIG. 7(B) shows that, if a subframe having D2DSS transmitted therein cannot be used for UE-to-UE D2D, the corresponding region can be used for the eNB-to-UE D2D. If UE-to-UE D2D cannot be performed in a corresponding subframe, or on a frequency where eNB-to-UE D2D is performed, the eNB-to-UE D2D is performed using a resource and a DMRS of a region where a synchronization signal is not transmitted.

Figure 8:
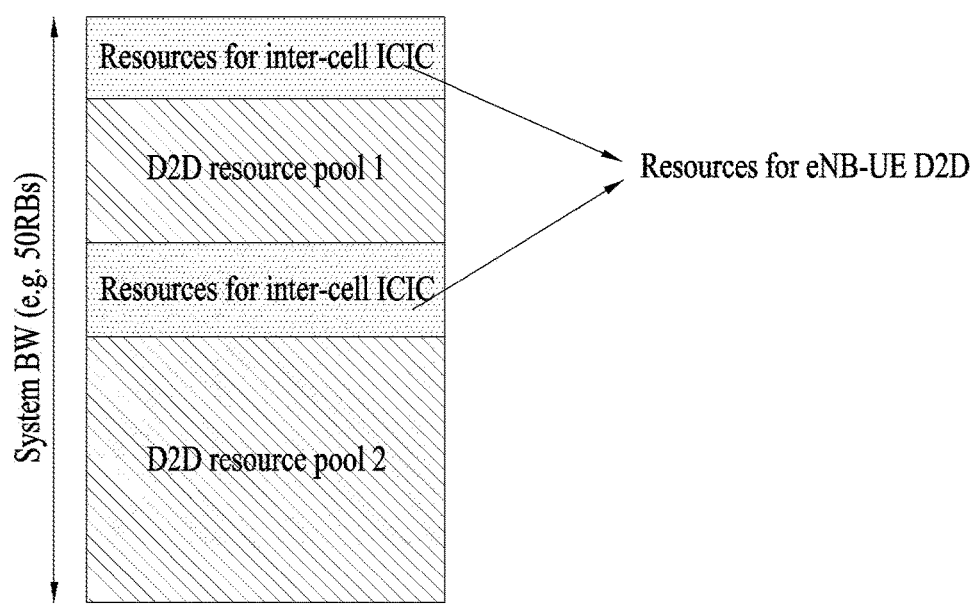

FIG. 8 illustrates an embodiment of, if a specific resource cannot be used for inter-cell or inter-D2D cluster interference adjustment and the like, using a corresponding resource for eNB-to-UE D2D. For example, D2D communication between user equipments in an edge region of each D2D cluster may receive a considerable interference effect due to an edge D2D transmission or an uplink transmission of an adjacent cluster, and an ICIC between adjacent D2D clusters may be performed to prevent such a situation. For example, each of the clusters may signal an intended resource of the corresponding cluster to the surroundings, and a signaled region may guarantee a channel quality in a manner of not being scheduled in an adjacent cluster or the like. Thus, the corresponding region may be used for eNB-to-UE D2D communication. This is because it is highly probable that D2D transmission is performed in a center part of a cell in case of the eNB-to-UE D2D. Namely, a user equipment having received a signaling of eNB-to-UE D2D communication performs D2D communication based on a D2D resource signaled by an e NB (or a cluster header user equipment) irrespective of a resource signaled for a D2D usage in advance.

With regard to the eNB-to-UE D2D and D2D control information, if the error is not found in the result of the CRC check and the TPC field value is the preset value, the user equipment may assume that a D2DSS (D2D synchronization signal), an SA (scheduling assignment), and a PD2DSCH (Physical D2D synchronization channel) are not transmitted.

Meanwhile, a control signaling (e.g. resource allocation, MCS, etc.) for eNB-to-UE D2D may reuse a control signaling defined for UE-to-UE D2D, or may use a signaling using PDCCH or EPDCCH. In case of using the PDCCH or the EPDCCH, the control signaling for the eNB-to-UE D2D may be distinguished from the control signaling for the UE-to-UE D2D by defining a separate RNTI (e.g., eD2D_RNTI), which may be transmitted UE-specifically or UE-group-specifically. The control signaling for the eNB-to-UE D2D may also mean that D2DSS, SA, PD2DSCH and the like defined in the UE-to-UE D2D communication are omitted from the corresponding D2D communication. And, not only a downlink transmission between a base station and a user equipment but also an uplink transmission may be defined. To this end, a presence or non-presence of a transmission from the base station or the user equipment may be indicated by the control signaling. (This is characterized in that a base station transmits a control signal in the eNB-to-UE D2D irrespective of a transmitting user equipment or a receiving user equipment, while the transmitting user equipment transmits a control signal in an existing D20.) The base station may also signal as to whether to use an existing uplink transmission or an uplink transmission using a D2D format for the uplink transmission in the eNB-to-UE D2D communication so as to resolve an interference coordination and timing misalignment with a UE-to-UE D2D pair, and the like.

If the eNB-to-UE D2D communication is indicated, that is, if the error is not found in the result of the CRC check and the TPC field value is the preset value, the user equipment may consider that a large-scale feature is the same as the synchronization signal transmitted from the base station in case of receiving a downlink signal from the base station on a resource indicated in the resource allocation information. Namely, in case of the eNB-to-UE D2D communication, a QCL (Quasi co-location) with WAN communication with the base station may be defined. More particularly, a user equipment having recognized an eNB-to-UE D2D transmission may assume that a synchronization signal (or a reference signal, PBCH, etc.) of a serving cell has a QCL relation with the corresponding D2D transmission when performing a demodulation for the corresponding D2D transmission. Through such an assumption, a D2D Rx user equipment can accurately identify informations on a timing offset, a frequency offset, a Doppler frequency (shift) and the like in comparison to a UE-to-UE D2D transmission.

As mentioned above, according to an embodiment of the present invention, an eNB may modify a usage of a previously defined resource if necessary. Namely, the eNB may instruct to transmit cellular uplink data in cellular uplink or D2D format on a resource designated for a cellular downlink, or may indicate that cellular downlink data is transmitted in the cellular downlink or D2D format on a resource designated for the cellular uplink. And, it is possible to perform an operation of performing a data transmission for a cellular usage on a resource for a D2D usage, an operation of performing a D2D transmission on a resource for the cellular usage, and the like are possible.

Device Configuration According to Embodiments of Present Invention

Figure 9:
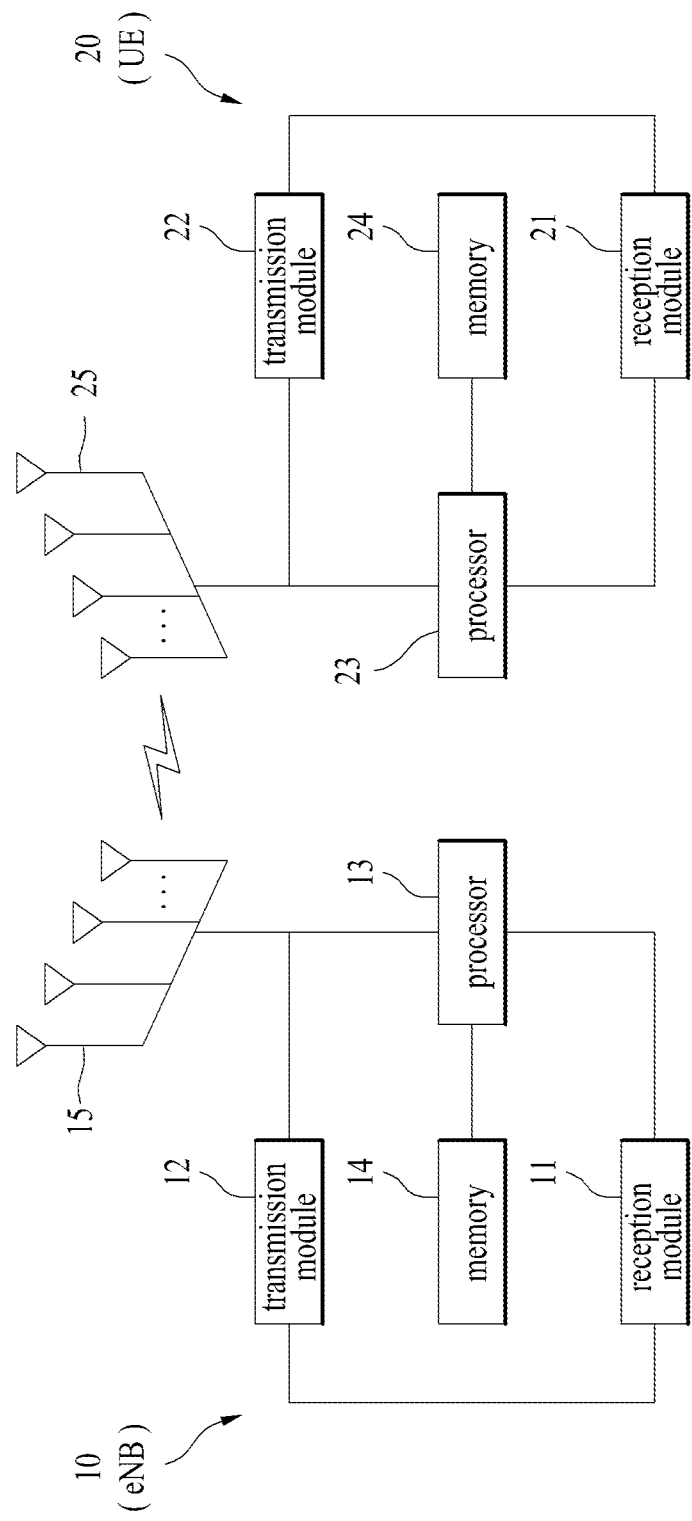
FIG. 9 is a diagram illustrating a configuration of a transceiving device.

FIG. 9 is a diagram to illustrate configurations of a transmitting point device and a user equipment device according to an embodiment of the present invention.

Referring to FIG. 9, a transmitting point device 10 according to the present invention may include a receiver module 11, a transmitter module 12, a processor 13, a memory 14, and a plurality of antennas 15. A plurality of the antennas 15 may mean a transmitting point device supporting MIMO transmission/reception. The receiver module 11 may receive various signals, data and informations in uplink from a user equipment. The transmitter module 12 may transmit various signals, data, and informations in downlink to the user equipment. The processor 13 may control overall operations of the transmitting point device 10.

The processor 13 of the transmission point device 10 according to one embodiment of the present invention may process items necessary for the respective embodiments described above.

The processor 13 of the transmitting point device 10 may also perform a function of processing operations of information received by the transmitting point device 10, information to transmit externally and the like. The memory 14 may store the operation-processed information and the like for a prescribed time, and may be substituted with a component such as a buffer (not shown) and so on.

Subsequently, Referring to FIG. 9, a user equipment device 20 may include a receiver module 21, a transmitter module 22, a processor 23, a memory 24, and a plurality of antennas 25. A plurality of the antennas 25 may mean a user equipment supporting MIMO transmission/reception. The receiver module 21 may receive various signals, data, and informations in a downlink from a base station. The transmitter module 22 may transmit various signals, data, and informations in uplink to the base station. The processor 23 may control overall operations of the user equipment device 20.

The processor 23 of the user equipment device 20 according to one embodiment of the present invention may process items necessary for the respective embodiments described above.

The processor 23 of the user equipment device 20 may also perform a function of processing operations of information received by the user equipment device 20, information to transmit externally and the like. The memory 24 may store the operation-processed information and the like for a prescribed time, and may be substituted with a component such as a buffer (not shown) and so on.

The above-detailed configurations of the transmitting point device and the user equipment device may be embodied in a manner of independently applying the aforementioned features described in the various embodiments of the present invention or simultaneously applying at least two of the embodiments, and redundant description shall be omitted for clarity.

The description of the transmitting point device 10 shown in FIG. 9 may be also applied to a relay device as a downlink transmission entity or uplink reception entity in the same manner, and the description of the user equipment device 20 may be also applied to a relay device as a downlink reception entity or uplink transmission entity in the same manner.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. The present invention is non-limited by the embodiments disclosed herein but intends to give the broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

Embodiments of the present invention as the above are applicable to various mobile communication systems.

What is claimed is:

1. A method for a device-to-device (D2D) user equipment to transceive a signal in a wireless communication system, the method comprising:
   receiving downlink control information (DCI) including resource allocation information;
   making a cyclic redundancy check (CRC) on the DCI using a D2D radio network temporary identifier (RNTI); and
   performing D2D communication on a resource indicated by the resource allocation information if a result of the CRC is errorless,
   wherein the resource indicated by the resource allocation information is an uplink resource allocated for D2D communication, and
   wherein the resource indicated by the resource allocation information is used for receiving a downlink signal from a base station, when a transmit power control (TPC) field value of the DCI is a preset value.

2. The method of claim 1, wherein the making the CRC on the DCI using the D2D RNTI is performed only if a subframe having the DCI received therein is included in a subframe set.

3. The method of claim 1, wherein if the CRC result is errorless and the TPC field value is the preset value, a D2D synchronization signal is regarded as not transmitted.

4. The method of claim 1, wherein if the CRC result is errorless and the TPC field value is the preset value, the resource indicated by the resource allocation information does not overlap with a resource indicated if the CRC result is errorless but the TPC field value is not the preset value.

5. The method of claim 1, wherein if the CRC result is errorless and the TPC field value is the preset value, the D2D user equipment assumes that a D2D synchronization signal (D2DDS), a scheduling assignment (SA) and a physical D2D synchronization channel (PD2DSCH) are not transmitted.

6. The method of claim 1, wherein if the CRC result is errorless and the TPC field value is the preset value, the user equipment regards a large-scale feature as the same as a synchronization signal transmitted from the base station when receiving the downlink signal from the base station on the resource indicated by the resource allocation information.

7. The method of claim 1, wherein the resource indicated by the resource allocation information exists on an uplink frequency band.

8. A device-to-device (D2D) user equipment device in a wireless communication system, the D2D user equipment device comprising:
a receiver; and
a processor,
wherein the processor is configured to:
control the receiver to receive downlink control information (DCI) including resource allocation information,
make a cyclic redundancy check (CRC) on the DCI using a D2D radio network temporary identifier (RNTI), and
if a result of the CRC is errorless, perform D2D communication on a resource indicated by the resource allocation information,
wherein the resource indicated by the resource allocation information is an uplink resource allocated for D2D communication, and
wherein the resource indicated by the resource allocation information is used for receiving a downlink signal from a base station, when a transmit power control (TPC) field value of the DCI is a preset value.

9. The D2D user equipment device of claim 8, wherein the processor makes the CRC on the DCI using the D2D RNTI only if a subframe having the DCI received therein is included in a subframe set.

10. The D2D user equipment device of claim 8, wherein if the CRC result is errorless and the TPC field value is the preset value, a D2D synchronization signal is regarded as not transmitted.

11. The D2D user equipment device of claim 8, wherein if the CRC result is errorless and the TPC field value is the preset value, the resource indicated by the resource allocation information does not overlap with a resource indicated if the CRC result is errorless but the TPC field value is not the preset value.

12. The D2D user equipment device of claim 8, wherein if the CRC result is errorless and the TPC field value is the preset value, the D2D user equipment assumes that a D2D synchronization signal (D2DDS), a scheduling assignment (SA) and a physical D2D synchronization channel (PD2DSCH) are not transmitted.

13. The D2D user equipment device of claim 8, wherein if the CRC result is errorless and the TPC field value is the preset value, when receiving the downlink signal from the base station on the resource indicated by the resource allocation information, the user equipment regards a large-scale feature as the same as a synchronization signal transmitted from the base station.

14. The D2D user equipment device of claim 8, wherein the resource indicated by the resource allocation information exists on an uplink frequency band.

* * * * *